US011853208B2

United States Patent
Nagaoka et al.

(10) Patent No.: US 11,853,208 B2
(45) Date of Patent: *Dec. 26, 2023

(54) STORAGE DEVICE AND STORAGE METHOD FOR CACHING ADDRESS CONVERSION TABLE

(71) Applicant: KIOXIA CORPORATION, Tokyo (JP)

(72) Inventors: Akinori Nagaoka, Tokyo (JP); Mitsunori Tadokoro, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,407

(22) Filed: Dec. 19, 2022

(65) Prior Publication Data

US 2023/0122919 A1    Apr. 20, 2023

Related U.S. Application Data

(63) Continuation of application No. 17/009,694, filed on Sep. 1, 2020, now Pat. No. 11,531,616.

(30) Foreign Application Priority Data

Mar. 23, 2020    (JP) ................................ 2020-050893

(51) Int. Cl.
G06F 12/02    (2006.01)
G06F 11/10    (2006.01)

(52) U.S. Cl.
CPC ...... *G06F 12/0292* (2013.01); *G06F 11/1068* (2013.01)

(58) Field of Classification Search
None
See application file for complete search history.

(56) References Cited

U.S. PATENT DOCUMENTS

| 7,653,779 B1 | 1/2010 | Fein et al. |
| 9,507,523 B1 | 11/2016 | Mullendore et al. |
| 2011/0131374 A1 | 6/2011 | Noeldner et al. |
| 2012/0254686 A1 | 10/2012 | Esumi et al. |
| 2012/0272123 A1 | 10/2012 | Yeh |
| 2013/0290610 A1 | 10/2013 | Kantani et al. |
| 2019/0114255 A1 | 4/2019 | Jain |
| 2019/0163620 A1 | 5/2019 | Muthiah et al. |

*Primary Examiner* — Christopher D Birkhimer
*Assistant Examiner* — Ryan Dare
(74) *Attorney, Agent, or Firm* — Kim & Stewart LLP

(57) ABSTRACT

A storage device includes a nonvolatile memory, a volatile memory, and a controller accesses the nonvolatile memory using an address conversion table including regions, each region including entries, each entry storing a physical address of the nonvolatile memory in association with a logical address, and reads and writes data of the address conversion table from and to the nonvolatile memory and the volatile memory in a unit of a frame. The controller writes, to the nonvolatile memory, data of a first region in a first format in which a head address of data of a region aligns with a head address of a frame, and writes, to the volatile memory, data of a second region in either the first format or a second format in which a head address of data of a region does not align with a head address of a frame.

20 Claims, 12 Drawing Sheets

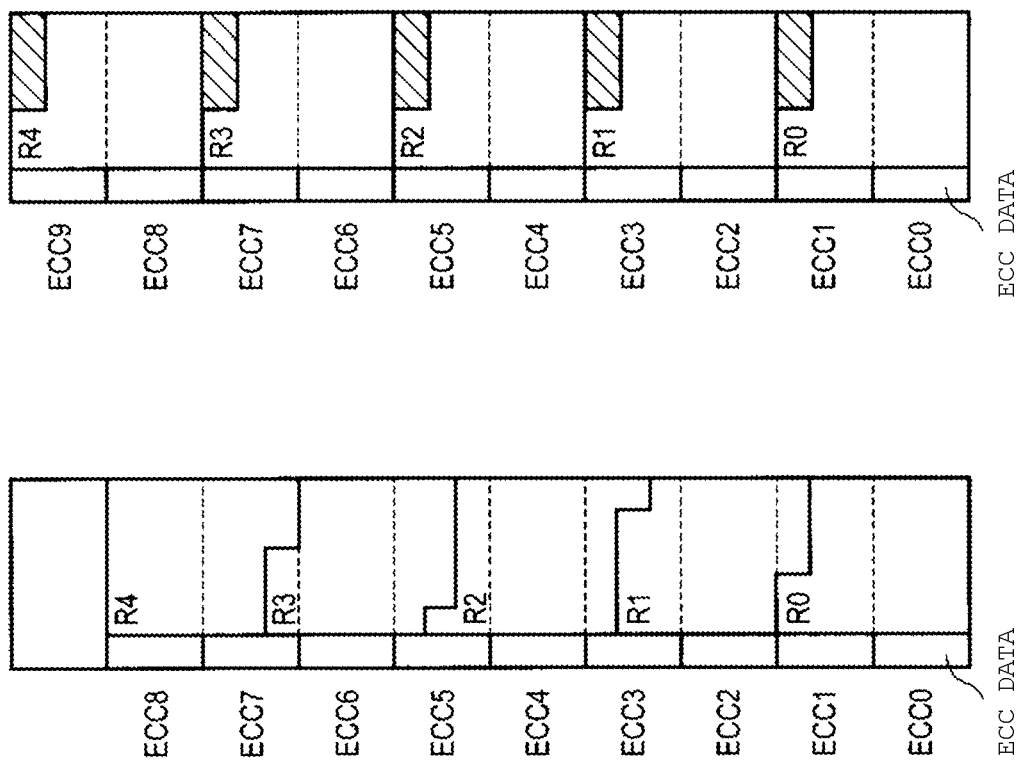

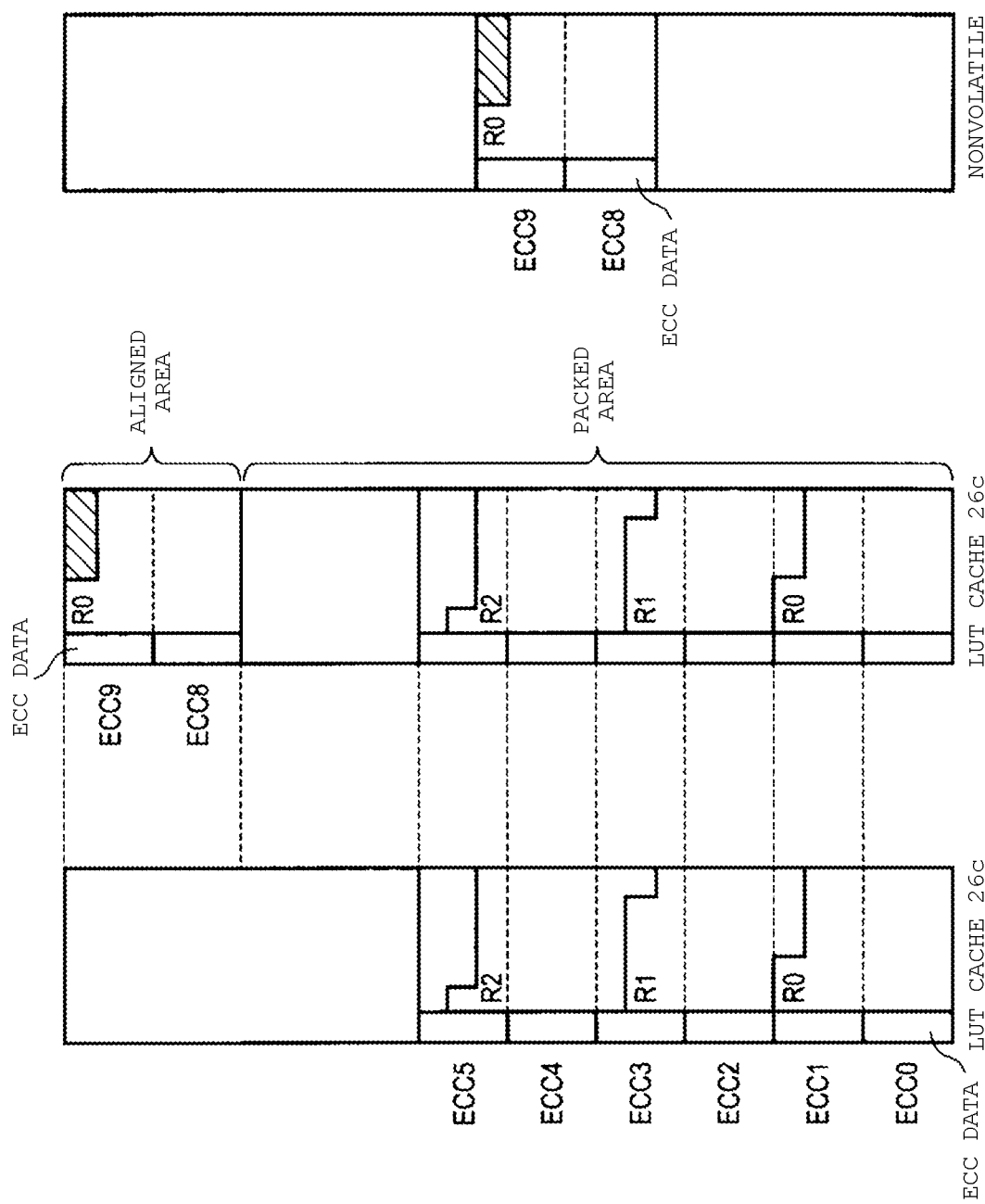

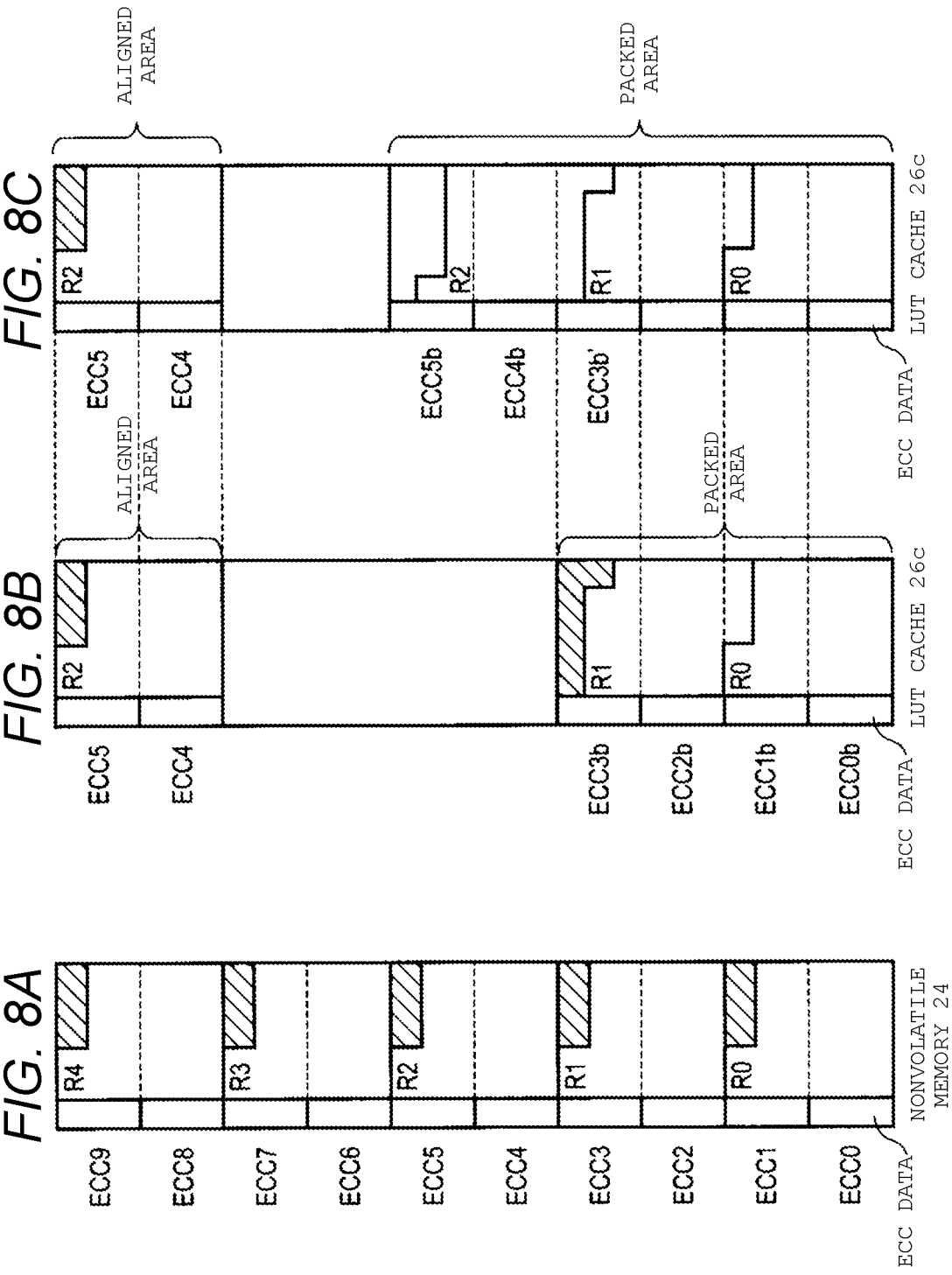

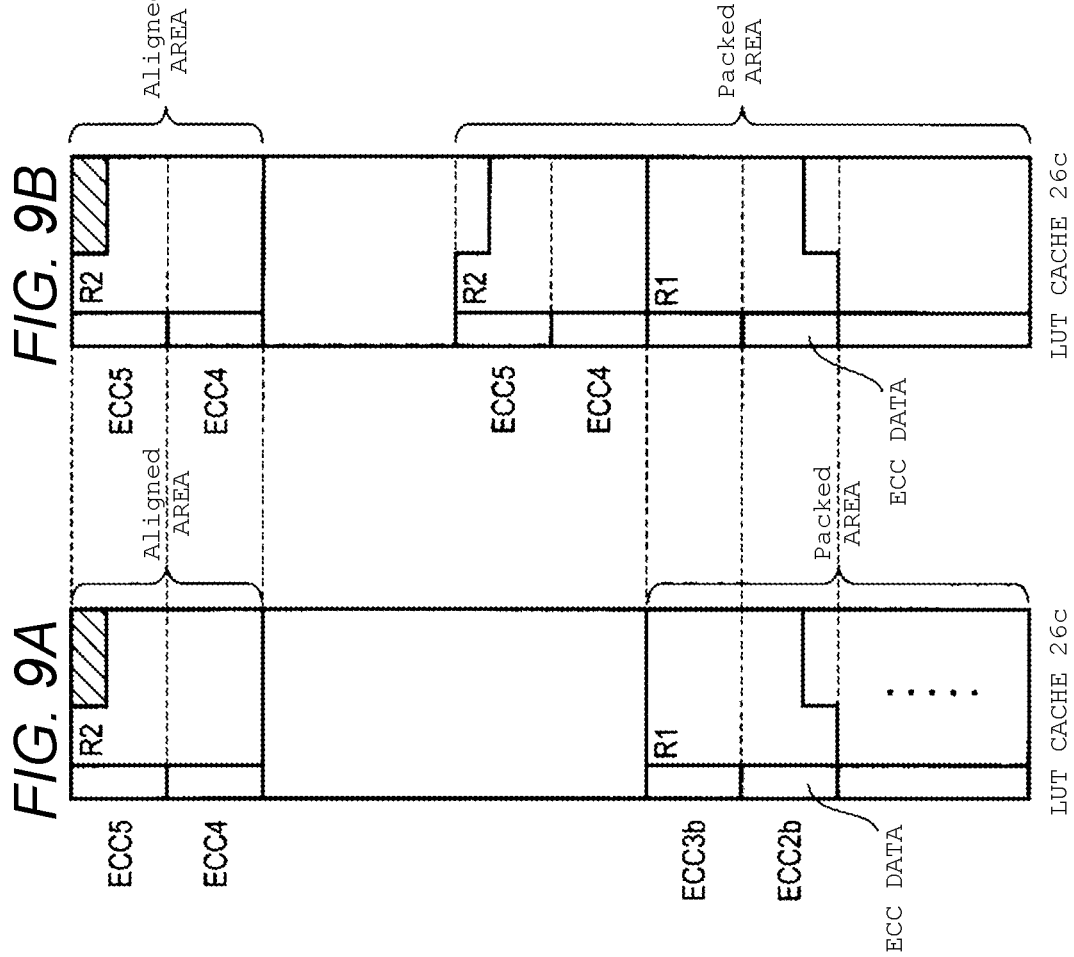

FIG. 11

| DRIVE CAPACITY | MCA Size (bits) | Unpacking | | Aligned | | Packed | |
|---|---|---|---|---|---|---|---|
| | | BIT WIDTH IN DRAM (bit/entry) | LUT Size (GB) | BIT WIDTH IN DRAM (bit/entry) | LUT Size (GB) | BIT WIDTH IN DRAM (bit/entry) | LUT Size (GB) |
| 256 GB | 27 | 32 | 0.22 | 28 | 0.21 | 27.98 | 0.19 |
| 1 TB | 29 | 32 | 0.87 | 32 | 0.87 | 30.06 | 0.82 |
| 4 TB | 31 | 36 | 3.93 | 34 | 3.71 | 32.13 | 3.51 |
| 16 TB | 33 | 45 | 19.67 | 36 | 15.73 | 34.21 | 14.95 |
| 64 TB | 35 | 45 | 78.66 | 38 | 66.43 | 36.28 | 63.42 |

STORAGE DEVICE AND STORAGE METHOD FOR CACHING ADDRESS CONVERSION TABLE

CROSS-REFERENCE TO RELATED APPLICATION

This application is a continuation of U.S. patent application Ser. No. 17/009,694, filed Sep. 1, 2020, which is based upon and claims the benefit of priority from Japanese Patent Application No. 2020-050893, filed Mar. 23, 2020, the entire contents of which are incorporated herein by reference.

FIELD

Embodiments described herein relate generally to a storage device, a method for controlling the storage device, and a non-transitory computer readable medium.

BACKGROUND

When storing data in a storage device, a host, which is an external information apparatus, indicates a data storage location in a nonvolatile memory of the storage device with a logical address. The storage device creates an address conversion table (also referred to as a lookup table (LUT)) that maps a logical address to a physical address of the nonvolatile memory in the storage device.

The address conversion table is stored in the nonvolatile memory. Additionally, a part of the address conversion table is cached in a volatile memory having a higher access speed. When a logical address designated by the host is included in the address conversion table stored in the volatile memory, the address conversion is performed at a higher speed.

When a volatile memory is used for caching an address conversion table, the size of an area of the volatile memory available for other purposes decreases.

BRIEF DESCRIPTION OF THE DRAWINGS

FIG. 5A is a diagram illustrating a data arrangement in a first state of an LUT cache.

FIG. 5B is a diagram illustrating a data arrangement in a second state of the LUT cache.

FIG. 5C is a diagram illustrating a data arrangement in a third state of the LUT cache.

FIG. 6A is a diagram illustrating a data arrangement in a fourth state of the LUT cache in a non-volatilization process for the address conversion table.

FIG. 6B is a diagram illustrating a data arrangement in a fifth state of the LUT cache in the non-volatilization process.

FIG. 6C is a diagram illustrating a data arrangement in a sixth state of an LUT area of a nonvolatile memory in the non-volatilization process.

FIG. 8A is a diagram illustrating a data arrangement in a seventh state of the LUT area in a loading process for the address conversion table.

FIG. 8B is a diagram illustrating a data arrangement in an eighth state of the LUT cache in the loading process.

FIG. 8C is a diagram illustrating a data arrangement in a ninth state of the LUT cache in the loading process.

FIG. 9A is a diagram illustrating a data arrangement in a tenth state of the LUT cache in the loading process.

FIG. 9B is a diagram illustrating a data arrangement in an eleventh state of the LUT cache in the loading process.

FIG. 11 is a diagram for comparing a size of an address conversion table stored in a volatile memory between different methods.

DETAILED DESCRIPTION

Figure 1:
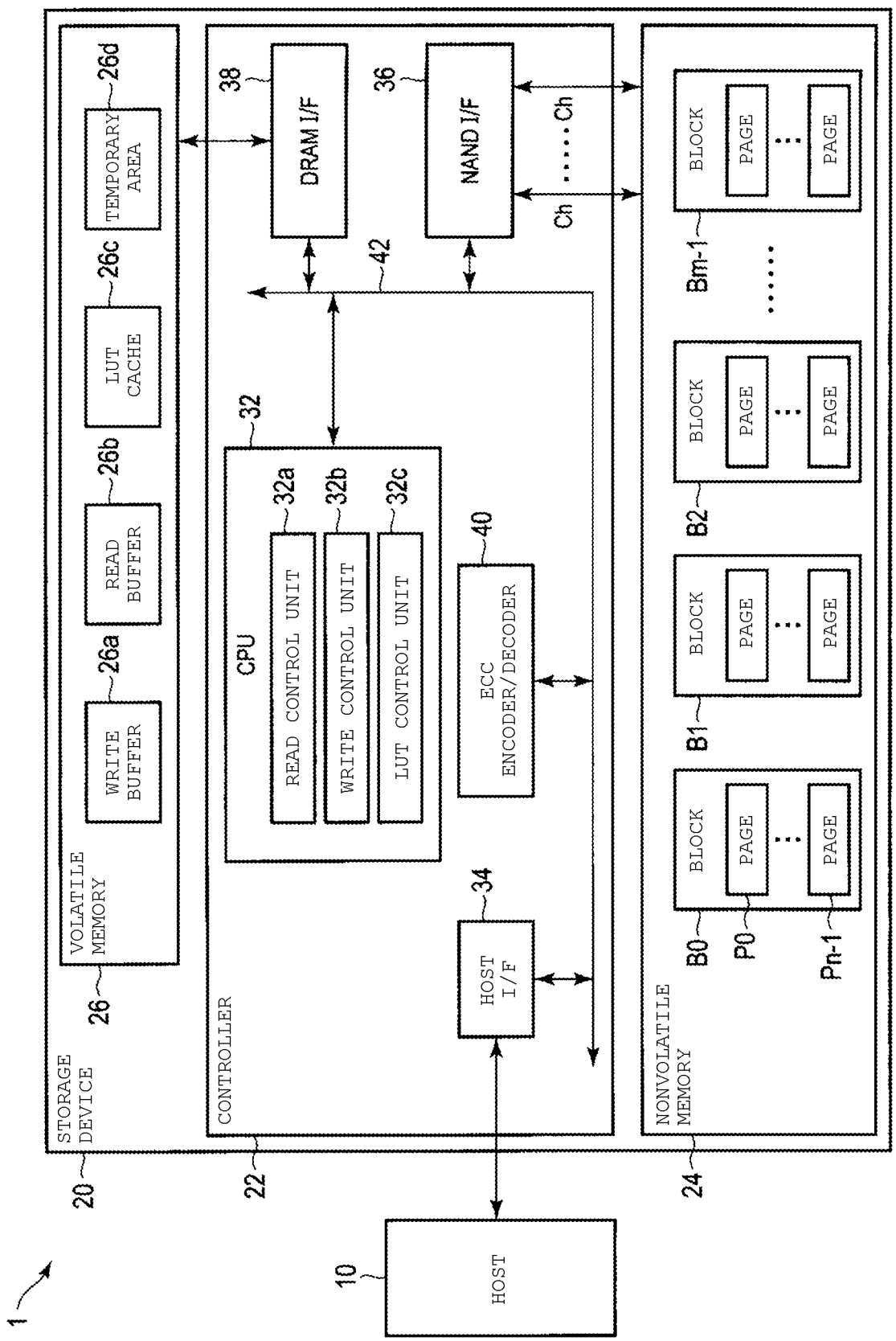
FIG. 1 is a block diagram illustrating an information processing system according to an embodiment.

Embodiments provide a storage device and a storage method capable of reducing a size of an address conversion table to be stored in a volatile memory.

In general, according to one embodiment, a storage device comprises a nonvolatile memory, a volatile memory, and a controller. The controller is configured to access the nonvolatile memory using an address conversion table including a plurality of regions, each region including a plurality of entries, each entry storing a physical address of the nonvolatile memory in association with a logical address. The controller is configured to read and write data of the address conversion table from and to the nonvolatile memory and the volatile memory in a unit of a frame. The controller is further configured to write, to the nonvolatile memory, data of a first region in a first format in which a head address of data of a region aligns with a head address of a frame, and write, to the volatile memory, data of a second region in either the first format or a second format in which a head address of data of a region does not align with a head address of a frame.

Hereinafter, embodiments will be described with reference to the drawings. The following description relates to devices and methods embodying the technical ideas of the present disclosure, and the technical ideas of the present disclosure are not limited to the structure, the shape, the arrangement, and the material of the constituent elements of the examples described below. Modifications that can be conceived of by those skilled in the art are covered by the scope of the present disclosure. In general, the drawings are schematic and in order to make the description clearer, a size, a thickness, a planar size, a shape, or the like of each element may be changed in the drawings with respect to the actual embodiments. Different drawings may depict elements having different dimensional relationships and ratios from each other. In the drawings, corresponding elements may be given the same reference numeral, and repeated description may be omitted. Different names may be given to a single element. In the following description, "connection" indicates not only a direct connection but also indirect connection via other elements.

FIG. 1 is a block diagram illustrating an information processing system 1 according to an embodiment. The information processing system 1 includes a host device 10 (hereinafter, referred to as a host 10) and a storage device 20.

The host 10 is an external information processing device that accesses the storage device 20.

The storage device 20 includes a controller 22, a nonvolatile memory 24, a volatile memory 26, and the like.

The controller 22 controls operations to read data from and write data to the nonvolatile memory 24 and the volatile memory 26. The controller 22 may be implemented by a circuit such as a system-on-chip (SoC).

The nonvolatile memory 24 stores data. The nonvolatile memory 24 can latch stored data even though power is not supplied. The nonvolatile memory 24 may be a two-dimensional structure NAND flash memory or a three-dimensional structure NAND flash memory. The nonvolatile memory 24 is not limited to the NAND flash memory, and a NOR flash memory or other nonvolatile semiconductor memories may be used.

Volatile memory 26 also stores data. The volatile memory 26 cannot latch stored data unless power is supplied. The volatile memory 26 is, for example, a dynamic random access memory (DRAM) based on the Double Data Rate 3 Low voltage (DDR3L) standard. The volatile memory 26 may be provided inside the controller 22. In this case, a static random access memory (SRAM) may be used as the volatile memory 26. A main memory (e.g., DRAM) of the host 10 may be used as a host memory buffer (HMB) instead of the volatile memory 26.

Next, a detailed configuration of the nonvolatile memory 24 will be described. A memory cell array of the nonvolatile memory 24 includes a plurality of blocks B0 to Bm-1. Each of the blocks B0 to Bm-1 includes a plurality of pages (herein, pages P0 to Pn-1). A block is a unit of data erasing. Each block will also be referred to as an erase block or a physical block. Each of pages P0 to Pn-1 includes a plurality of memory cells connected to the same word line. A page is a unit of data writing and data reading. A word line may be a unit of data writing and data reading.

The maximum number of times of programming and erasing (hereinafter, referred to as a P/E cycle) allowable for each of the blocks B0 to Bm-1 is restricted. One P/E cycle of a certain block includes data erasing for bringing all the memory cells of the block into an erased state and programming for writing data into each page of the block.

Next, a detailed configuration of the volatile memory 26 will be described. The volatile memory 26 includes a write buffer 26a, a read buffer 26b, a lookup table cache (LUT cache) 26c, and a temporary area 26d. The write buffer 26a temporarily stores data to be written into the nonvolatile memory 24. The read buffer 26b temporarily stores data that has been read from the nonvolatile memory 24. The LUT cache 26c stores at least a part of data (copy) of an address conversion table (also referred to as a lookup table or an LUT) indicating a correspondence or mapping between a logical address and a physical address. The temporary area 26d temporarily stores data of the LUT in operation when the LUT is updated.

The logical address is an address used for the host 10 to logically indicate a storage location of data in the information processing system 1. An example of the logical address is a logical block address (LBA). The physical address is an address indicating a physical data storage location in the nonvolatile memory 24. Obtaining a corresponding physical address from a logical address will be referred to as address conversion or address solution.

Figure 2:
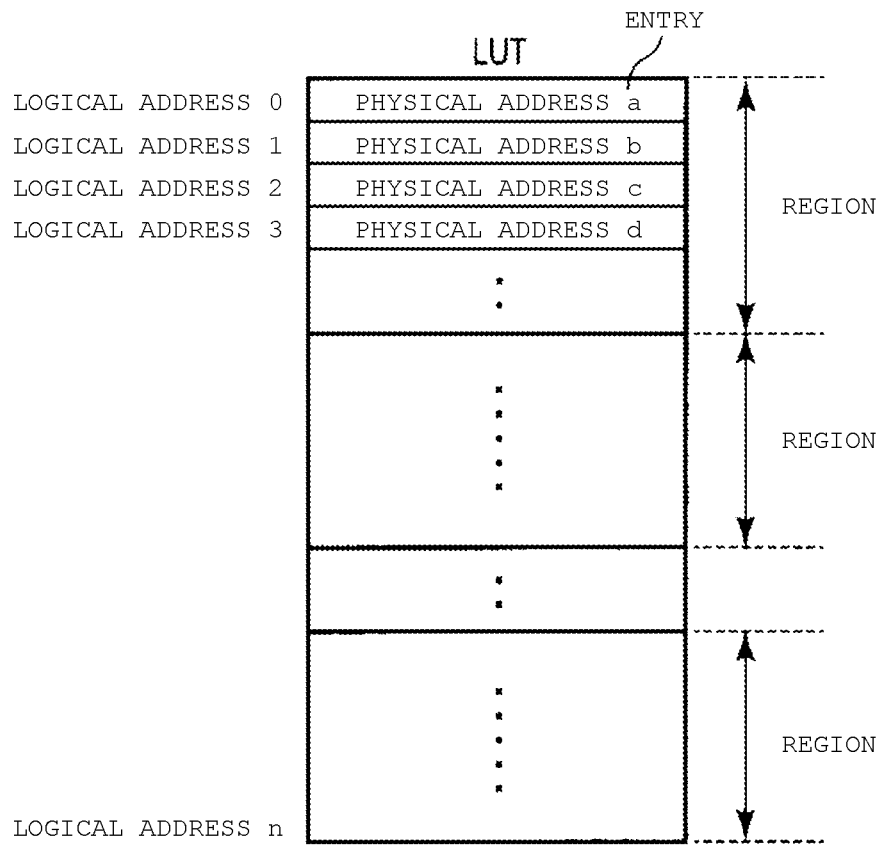
FIG. 2 is a diagram illustrating an address conversion table.

Next, the address conversion table (LUT) will be described in detail. FIG. 2 is a diagram illustrating an example of the address conversion table. The LUT is a correspondence table between a plurality of logical addresses and a plurality of physical addresses of the nonvolatile memory 24. The minimum constituent unit of the LUT will be referred to as an entry. The entry corresponds to each logical address, and a physical address corresponding to a logical address is stored in each entry. The LUT is stored in the nonvolatile memory 24. A size of the LUT is about 1/1000 of a storage capacity of the nonvolatile memory 24. The LUT is managed in the unit called a region formed of a plurality of entries. For example, 128 entries form a single region. FIG. 2 illustrates an example in which entries are disposed in a logical address order (for example, ascending order) in a region, but the arrangement of the entries in the region is not limited thereto and is freely selected.

The LUT is transmitted not in the entry unit but in the region unit between the nonvolatile memory 24 and the LUT cache 26c. Access to an entry is performed based on a value indicating a distance (offset) from the head of a region. The controller 22 duplicates at least a part of the LUT from the nonvolatile memory 24 to the LUT cache 26c. The duplicate process will also be referred to as a loading process or a volatilization process. An LUT to be duplicated is formed of at least one region. A size of the LUT cache 26c may be a size sufficient to store all entries of the LUT stored in the nonvolatile memory 24, or may be a size sufficient to store only some entries of the LUT stored in the nonvolatile memory 24. In the latter case, the controller 22 may select an LUT to be duplicated such that the LUT includes a physical address that is expected to be accessed highly frequently. Such a LUT duplicated to the LUT cache 26c will be referred to as a duplicate LUT.

When a logical address to be accessed is included in a duplicate LUT, the controller 22 uses the duplicate LUT to perform address conversion. When a logical address to be accessed is not included in a duplicate LUT, the controller 22 duplicates a region including the logical address to be accessed in the LUT from the nonvolatile memory 24 to the volatile memory 26 as a duplicate LUT. The controller 22 performs address conversion by using the duplicate LUT.

The duplicate LUT may be updated. When the duplicate LUT is updated, a copy of the updated duplicate LUT is written into the nonvolatile memory 24. As a result, the LUT stored in the nonvolatile memory 24 is also updated.

Data can be written into one page of the nonvolatile memory 24 only once per P/E cycle. Therefore, when data corresponding to a certain logical address is updated, the controller 22 writes update data into another physical address instead of the physical address in which data is originally stored. The controller 22 correlates the certain logical address with an entry of another physical address in the LUT and invalidates an entry of the original data before update. When data is written into the nonvolatile memory 24, the controller 22 adjusts a correspondence relationship between a logical address and a physical address such that the number of times of P/E for each block is as equal as possible.

Data being referred to from the LUT (that is, the latest data associated with a logical address) will be referred to as valid data. Data that is not associated with any logical address will be referred to as invalid data. The valid data is likely to be read from the host 10 in the future. The invalid data is not likely to be read from the host 10.

Next, a detailed configuration of the controller 22 will be described. The controller 22 includes a CPU 32, a host interface (I/F) 34, a NAND interface (I/F) 36, a DRAM interface (I/F) 38, an error correction code (ECC) encoder/decoder 40, and the like. The CPU 32, the host I/F 34, the NAND I/F 36, the DRAM I/F 38, and the ECC encoder/decoder 40 are connected to a bus line 42.

The CPU 32 may load firmware stored in the nonvolatile memory 24 to the volatile memory 26 and execute command processing for processing various commands from the host 10 such as a read command and a write command for the nonvolatile memory 24. Thus, the CPU 32 operates as a read control unit 32a, a write control unit 32b, and an LUT control unit 32c. The read control unit 32a controls reading of data from the nonvolatile memory 24. The write control unit 32b controls writing of data into the nonvolatile memory 24. The LUT control unit 32c controls creation, update, non-volatilization, loading, and the like of the LUT. Some or all of the read control unit 32a, the write control unit 32b, and the LUT control unit 32c may be implemented by dedicated circuits in the controller 22.

The host I/F 34 communicably connects the host 10 and the controller 22 to each other. Various standards may be used for the host I/F 34. For example, Small Computer System Interface (SCSI®), PCI Express® ((also referred to as PCIe®), Serial Attached SCSI (SAS®), Serial Advanced Technology Attachment (SATA®), Non Volatile Memory Express (NVMe®), Universal Serial Bus (USB®), Universal Asynchronous Receiver/Transmitter (UART®), Ethernet®, or Fibre channel may be used for the host I/F 34.

The NAND I/F 36 communicably connects the controller 22 and the nonvolatile memory 24 to each other. As the NAND I/F 36, a toggle DDR, an open NAND flash interface (ONFI), or the like may be used. The NAND I/F 36 may be connected to a plurality of chips of the nonvolatile memory 24 via a plurality of channels Ch.

The DRAM I/F 38 communicably connects the controller 22 and the volatile memory 26 to each other.

The ECC encoder/decoder 40 generates error correction code (ECC) data for data stored in the nonvolatile memory 24 or data stored in the volatile memory 26, and forms an ECC frame including stored data and the ECC data. This operation will be referred to as encoding. The ECC encoder/decoder 40 stores the ECC frame in the nonvolatile memory 24 or the volatile memory 26. The ECC encoder/decoder 40 corrects an error in the ECC frame read from the nonvolatile memory 24 or the volatile memory 26, and extracts the stored data. This operation will be referred to as decoding. Examples of data encoded by the ECC encoder/decoder 40 include the LUT and user data. An ECC frame for the LUT and an ECC frame for the user data may have different sizes. Examples of ECC data include a Hamming code and a BCH code.

Figure 3:
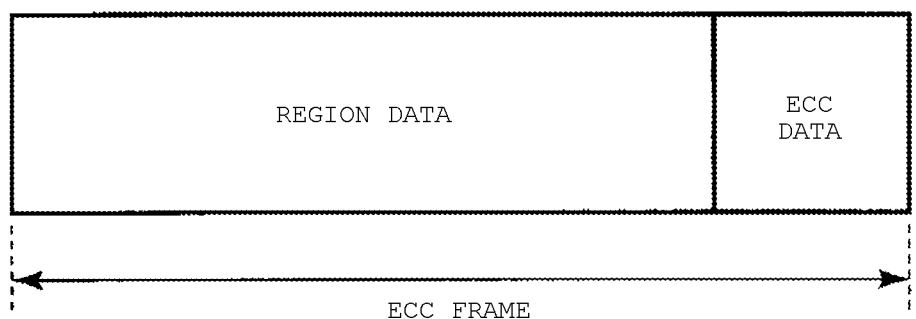
FIG. 3 is a diagram illustrating a data structure of an ECC frame.

Here, a data arrangement of an ECC frame for storing the LUT will be described with reference to FIG. 3. A single ECC frame is formed of, for example, data of a part of a single region (hereinafter referred to as the "region data") and ECC data. In FIG. 3, the ECC data is disposed at the end of the ECC frame, but the ECC data may be disposed anywhere in the ECC frame. For example, the ECC data may be disposed in the head or the middle of the ECC frame. The ECC data may not be collectively disposed at one location, and may be distributed and disposed in the ECC frame. The ECC frame and region have any size. For example, the size of the ECC frame may be 8 bytes, and the size of the region may be 128 bytes. In this case, a single region is distributed to and stored in a plurality of ECC frames. There may be a free area in a single ECC frame.

Figure 4A:
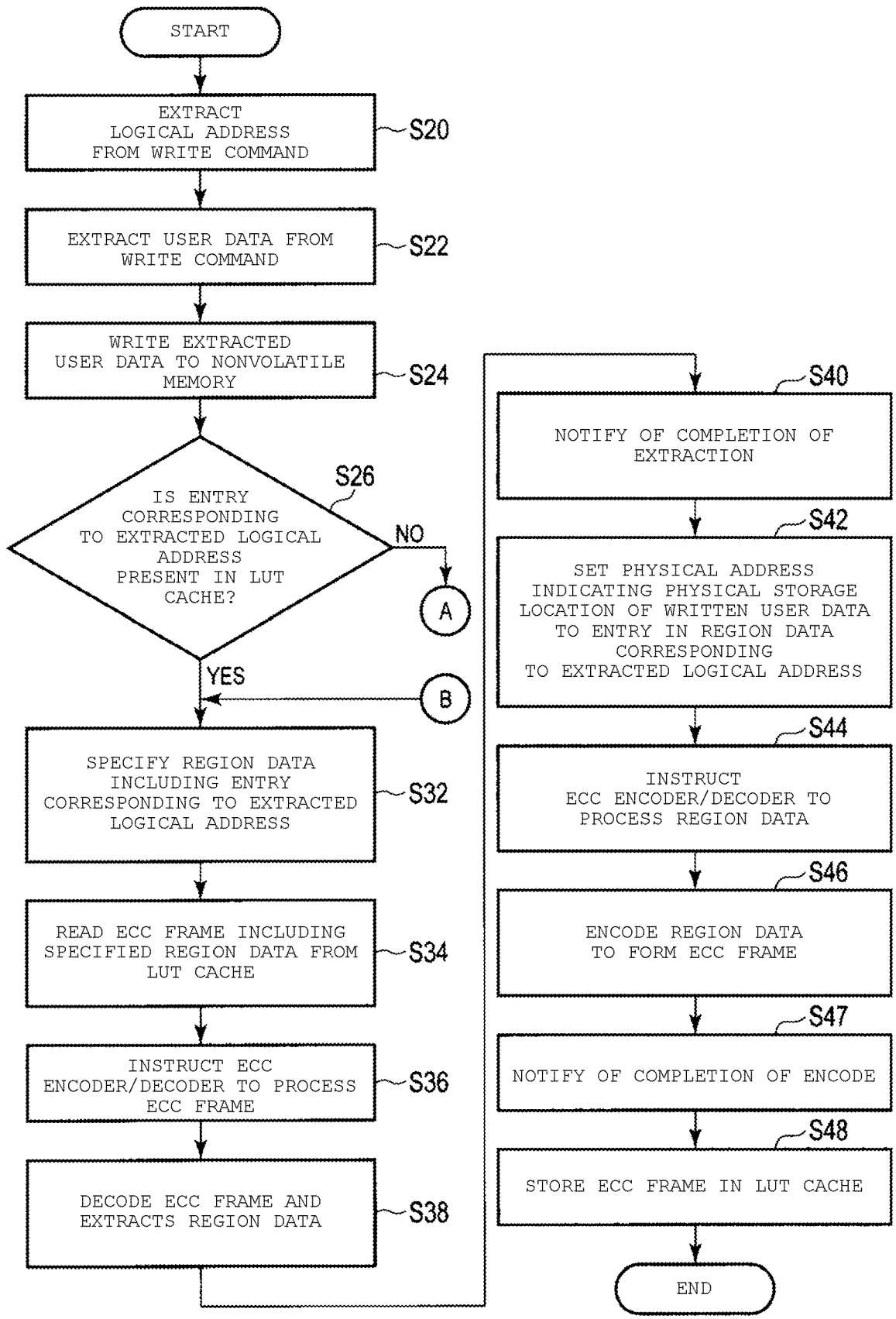
FIG. 4A is a flowchart of a write operation.
Figure 4B:
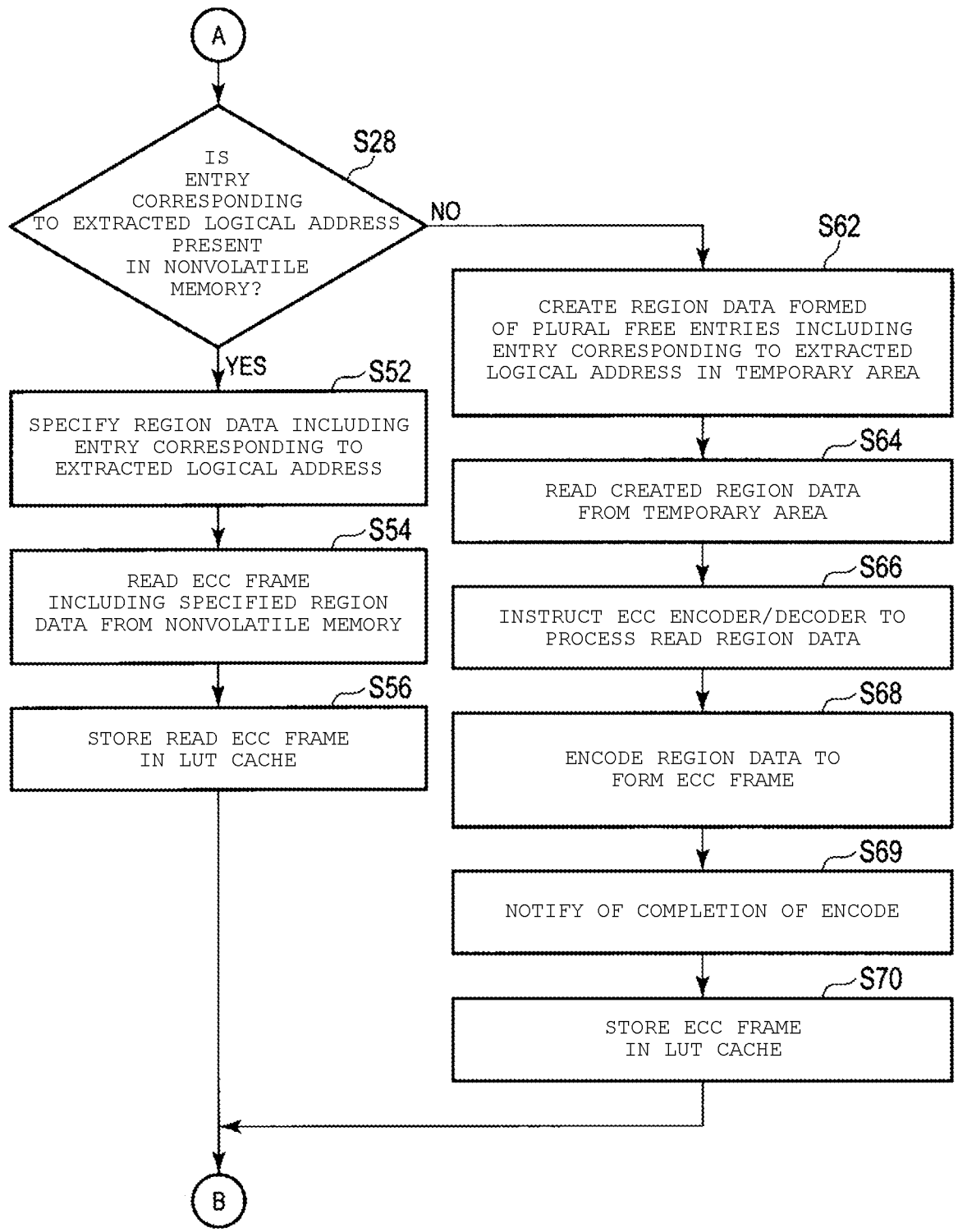
FIG. 4B is a flowchart of a write operation.

A write operation in the storage device 20 will be described with reference to flowcharts in FIGS. 4A and 4B. 4A and 4B illustrate an operation of the CPU 32 when a write command is issued by the host 10. The write command includes user data and a logical address.

When the write command is received, the CPU 32 extracts the logical address from the write command (S20). After the logical address is extracted, the CPU 32 extracts the user data from the write command (S22). After the user data is extracted, the CPU 32 writes the extracted user data into the nonvolatile memory 24 by using the write control unit 32b (S24). A writing order is fixed for the nonvolatile memory 24. For example, data is written into the nonvolatile memory 24 in an ascending order of physical addresses. The CPU 32 may execute S22 and S24 first, and then may execute S20.

After the user data is written into the nonvolatile memory 24, the CPU 32 uses the LUT control unit 32c to determine whether an entry corresponding to the logical address extracted in S20 is present in the LUT cache 26c (S26).

When the entry corresponding to the logical address extracted in S20 is present in the LUT cache 26c (YES in S26), the CPU 32 specifies region data including the entry corresponding to the logical address extracted in S20 (S32). After the region data is specified, the CPU 32 controls the read control unit 32a to read an ECC frame including the specified region data from the LUT cache 26c (S34). After the ECC frame is read, the CPU 32 instructs the ECC encoder/decoder 40 to process the read ECC frame (S36).

Upon receipt of the instruction from the CPU 32, the ECC encoder/decoder 40 decodes the ECC frame and extracts the region data (S38). After the region data is extracted, the ECC encoder/decoder 40 notifies the CPU 32 of the completion of the extraction (S40).

When the extraction of the region data is completed, the CPU 32 sets a physical address indicating a physical storage location of the user data written in S24 to the entry in the region data corresponding to the logical address extracted in S20 (S42). The CPU 32 instructs the ECC encoder/decoder 40 to process the region data in which the physical address is set (S44).

Upon receipt of the instruction, the ECC encoder/decoder 40 encodes the received region data to form an ECC frame (S46). The ECC encoder/decoder 40 notifies the CPU 32 of the completion of forming of the ECC frame (S47).

The CPU 32 stores the received ECC frame in the LUT cache 26c (S48). After S48, the process is finished. As a result, a correspondence relationship between the physical address and the logical address of the user data written in S24 is written into the LUT cache 26c as a duplicate LUT. Although the details will be described later, the duplicate LUT stored in the LUT cache 26c is transmitted to the nonvolatile memory 24 at an appropriate timing to be non-volatilized.

When the entry corresponding the logical address extracted in S20 is not present in the LUT cache 26c (NO in S26), the CPU 32 determines whether the entry corresponding to the logical address extracted in S20 is present in the nonvolatile memory 24 (S28).

When the entry corresponding to the logical address extracted in S20 is present in the nonvolatile memory 24 (YES in S28), the CPU 32 specifies region data including the entry corresponding to the logical address extracted in S20 (S52). After the region data is specified, the CPU 32 reads the ECC frame including the specified region data from the nonvolatile memory 24 (S54). After the ECC frame is read, the CPU 32 stores the read ECC frame into the LUT cache 26c (S56). As a result, the region data including the entry in which the physical address of the user data written in S24 is stored is written into the LUT cache 26c. Before S56, the CPU 32 may delete, from the LUT cache 26c, a region that has not been accessed for the longest time based on attribute information. When invalid data is deleted, it is necessary not to destroy other region data in a target ECC frame. The attribute information indicates access time at which the region was referred to last. The attribute information may be added to the region.

After S56, the CPU 32 specifies the region data including the entry corresponding to the logical address extracted in S20 (S32). Thereafter, the processes in S34, S36, S38, S40, S42, S44, S46, S47, and S48 are executed.

When the entry corresponding to the logical address extracted in S20 is not present in the nonvolatile memory 24 (NO in S28), the CPU 32 creates region data formed of a plurality of free entries including the entry corresponding to the logical address extracted in S20 in the temporary area 26d (S62). The free entry is an entry which corresponds to a logical address but of which a corresponding physical address is invalid. After the region data is created, the CPU 32 reads the created region data from the temporary area 26d (S64). After the region data is read, the CPU 32 instructs the ECC encoder/decoder 40 to process the read region data (S66).

Upon receipt of the instruction, the ECC encoder/decoder 40 encodes the region data to form an ECC frame (S68). The ECC encoder/decoder 40 notifies the CPU 32 of completion of encoding of the ECC frame (S69).

The CPU 32 stores the ECC frame in the LUT cache 26c (S70). Before S70, the CPU 32 may delete, from the LUT cache 26c, a region that has not been accessed for the longest time based on the attribute information.

After S70, the CPU 32 specifies the region data including the entry corresponding to the logical address extracted in S20 (S32). Thereafter, the processes in S34, S36, S38, S40, S42, S44, S46, S47, and S48 are executed.

FIG. 5A illustrates a data arrangement in a first state of the LUT cache 26c. FIG. 5B illustrates a data arrangement in a second state of the LUT cache 26c. FIG. 5C illustrates a data arrangement in a third state of the LUT cache 26c. FIGS. 5A, 5B, and 5C each illustrate a data arrangement in an address space of the LUT cache 26c. A bottom edge in each of FIGS. 5A, 5B, and 5C indicates a base address.

In the first state of the LUT cache 26c, a plurality of pieces of region data are packed and stored such that no free area is generated therebetween. The first state will also be referred to as a packed state. In the example in FIG. 5A, five pieces of region data R0 to R4 are packed and stored in nine ECC frames ECC0 to ECC8. In FIG. 5, for convenience of description, an example in which a size of a single piece of region data is larger than one ECC frame but smaller than two ECC frames is illustrated. However, the size of the single piece of region data may be larger than i (where i is a positive integer of 3 or more) ECC frames, but may be smaller than (i+1) ECC frames. The size of the single piece of region data may be smaller than one ECC frame.

In the second state of the LUT cache 26c, a plurality of pieces of region data are stored such that a free area is generated therebetween. The second state will also be referred to as an aligned state. In the example in FIG. 5B, each piece of region data is stored in two ECC frames in the aligned state. That is, five pieces of region data R0 to R4 are stored in ten ECC frames ECC0 to ECC9 with free areas left (a hatched area in FIG. 5B). No other region data is stored in the free area.

In the third state of the LUT cache 26c, some region data are stored in the packed state and the other region data are stored in the aligned state. In the example in FIG. 5C, four pieces of region data R0 to R3 are stored in eight ECC frames ECC0 to ECC7 in the packed state. The ECC frame ECC7 in which a part of the region data R3 is stored includes a free area. A single piece of region data R4 is stored in two ECC frames ECC8 and ECC9 together with a free area in the aligned state. An area (or an ECC frame) in which the region data is stored in the aligned state in an address space of the LUT cache 26c will also be referred to as an aligned area. An area (or an ECC frame) in which the region data is stored in the packed state in the address space of the LUT cache 26c will be referred to as a packed area.

When the pieces of region data are stored in the LUT cache 26c in the first state (packed state), no free area is generated between the pieces of region data. Therefore, the use efficiency of a storage capacity of the LUT cache 26c (more broadly, volatile memory 26) in the first state is high. In the first state, a head address of the region data and a head address of the ECC frame do not necessarily match each other. Therefore, in the first state, processing such as address offset may be necessary when the region data is read. That is, the first state is a data arrangement in which it takes time to read the region data.

When the pieces of region data are stored in the LUT cache 26c in the second state (aligned state), a free area is generated between the pieces of region data. Therefore, the use efficiency of a storage capacity of the LUT cache 26c (more broadly, volatile memory 26) in the second state is lower than the first state. In the second state, a head address of the region data and a head address of the ECC frame match each other. Therefore, in the second state, processing such as address offset is unnecessary when the region data is accessed. That is, the second state is a data arrangement in which it does not take time to read the region data.

When the region data is stored in the LUT cache 26c in the third state (a mixed state which is a combination of the packed state and the aligned state), the advantages of the first state and the second state can be at least partially obtained. When the ECC frame is stored into the LUT cache 26c, a plurality of ECC frames in the packed state may be created and stored in a packed area, and a plurality of ECC frames in the aligned state may be created and temporarily stored in an aligned area. The plurality of ECC frames in the aligned state may be changed to a plurality of ECC frames in the packed state and then stored in a packed area.

FIG. 6A illustrates a data arrangement in a fourth state of the LUT cache 26c. FIG. 6B illustrates a data arrangement in a fifth state of the LUT cache 26c. FIG. 6C illustrates a data arrangement in a sixth state of an LUT area in the nonvolatile memory 24.

A size of the LUT area is a size sufficient to store physical data of all regions of an LUT. FIGS. 6A and 6B illustrate data arrangements in the address space of the LUT cache 26c. FIG. 6C illustrates a data arrangement in the address space of the nonvolatile memory 24. A bottom edge in each of FIGS. 6A, 6B, and 6C indicates a base address. The fourth state of the LUT cache 26c illustrated in FIG. 6A is a state in which the pieces of region data (R0, R1, and R2) are stored in the packed area and no region data is stored in the aligned area. In the fifth state of the LUT cache 26c illustrated in FIG. 6B, the pieces of region data (R0, R1, and R2) are stored in the packed area, and a copy of the single piece of region data (R0) stored in the packed area is stored in the aligned area. The sixth state of the nonvolatile memory 24 illustrated in FIG. 6C is a state in which the region data (R0) in the aligned state is stored.

A duplicate LUT stored in the LUT cache 26c is transmitted to the nonvolatile memory 24 at an appropriate timing and stored into the nonvolatile memory 24. This will be referred to as non-volatilization of the duplicate LUT. The appropriate timing may be, for example, immediately before the power supply of the storage device 20 is turned off, may be a regular interval, or may be a timing at which a size of the duplicate LUT stored in the LUT cache 26c exceeds a certain size.

When the duplicate LUT is non-volatilized, region data stored in the packed state in the LUT cache 26c is converted into region data in the aligned state before being transmitted to the nonvolatile memory 24. When region data is stored into the nonvolatile memory 24, the region data is stored in the aligned state.

Figure 7:
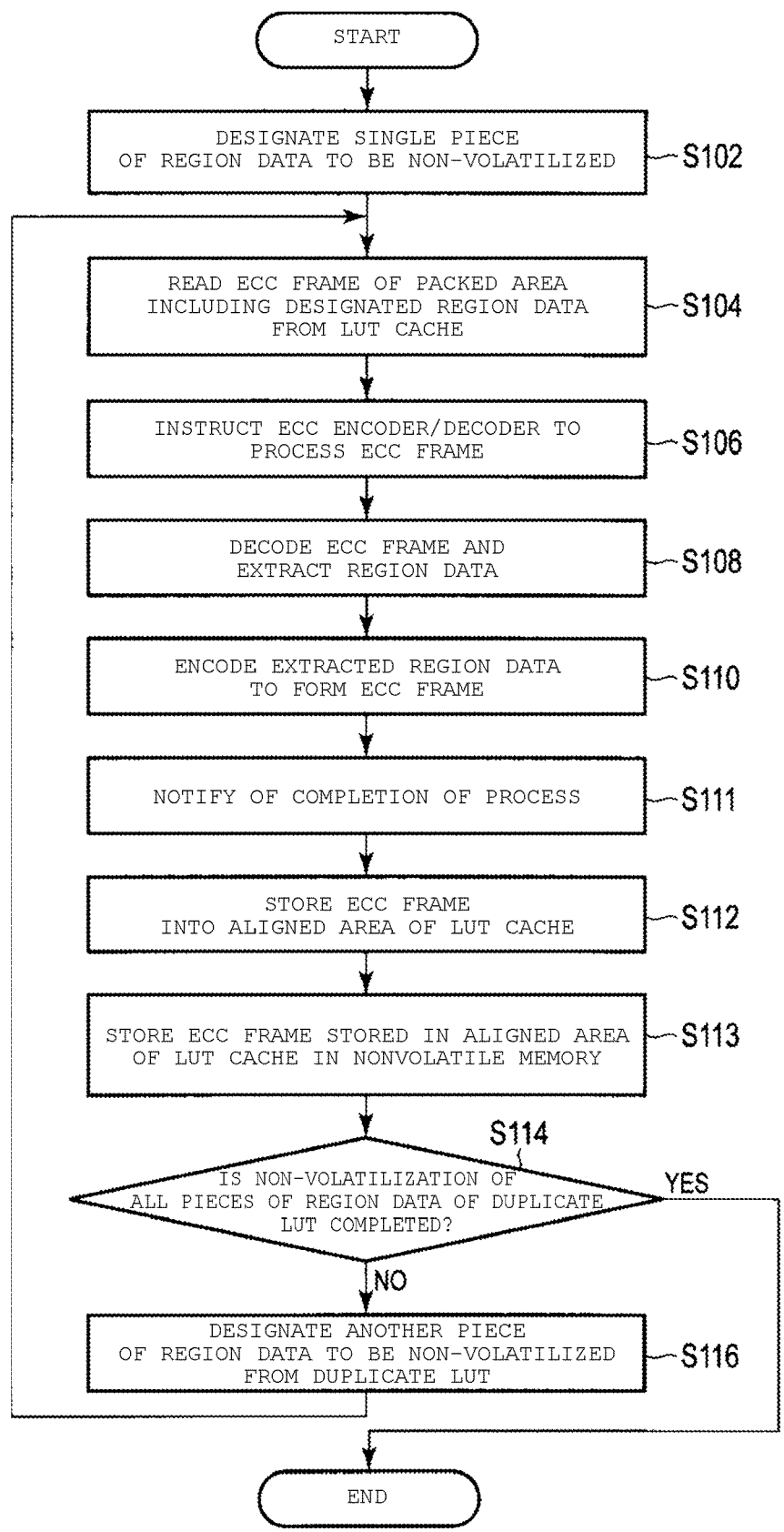
FIG. 7 is a flowchart the non-volatilization process for the address conversion table.

A non-volatilizing process for a duplicate LUT will be described. FIG. 7 is a flow chart of the non-volatilization process for the address conversion table.

At an execution timing of the non-volatilization process, the CPU 32 designates a single piece of region data to be non-volatilized from a duplicate LUT stored in the LUT cache 26c (S102). The execution timing of the non-volatilization process is, for example, immediately before the power supply of the storage device 20 is turned off, a timing at which a size of a duplicate LUT stored in the LUT cache 26c exceeds a certain size, or a timing at which a predetermined period elapses from the execution of the previous non-volatilization process.

After the single piece of region data to be non-volatilized is designated, the CPU 32 uses the LUT control unit 32c to read an ECC frame in a packed area including the designated region data from the LUT cache 26c (S104). In S104, there may be a plurality of ECC frames in the packed area including the designated region data. After the ECC frame is read from the LUT cache 26c, the CPU 32 instructs the ECC encoder/decoder 40 to process the read ECC frame (S106).

Upon receipt of the instruction from the CPU 32, the ECC encoder/decoder 40 decodes the ECC frame and extracts the region data (S108).

After the region data is extracted, the ECC encoder/decoder 40 encodes the extracted region data to form an ECC frame (S110). The ECC encoder/decoder 40 notifies the CPU 32 of the completion of the process (S111).

The CPU 32 stores the ECC frame into an aligned area of the LUT cache 26c (S112). The CPU 32 then stores the ECC frame stored in the aligned area of the LUT cache 26c in the nonvolatile memory 24 (S113). As a result, the single piece of region data is non-volatilized. The nonvolatile memory 24 has an LUT area having a size sufficient to store all pieces of region data of the LUT, and thus stores an ECC frame in the aligned state into an available block of an LUT area in the aligned state.

After the ECC frame is stored into the nonvolatile memory 24, the CPU 32 determines whether non-volatilization of all pieces of the region data of the duplicate LUT is completed based on a total size of the non-volatilized region data (S114).

When the non-volatilization of all pieces of the region data of the duplicate LUT is not completed (NO in S114), the CPU 32 designates another piece of region data to be non-volatilized from the duplicate LUT (S116) and repeatedly performs the processes from S104.

When the non-volatilization of all pieces of the region data of the duplicate LUT is completed (YES in S114), the CPU 32 finishes the process.

Since a packed area is provided in the LUT cache 26c, an amount of region data that can be stored in the LUT cache 26c can be increased compared with a case where the entire LUT cache 26c is an aligned area. Since an aligned area is also provided in the LUT cache 26c, the entire ECC frame stored in the aligned area can be made a non-volatilization target of a duplicate LUT with ECC data attached.

Next, a description will be made to explain a loading process (also referred to as an LUT volatilization process) for storing a part of an LUT stored in the nonvolatile memory 24 to the LUT cache 26c as a duplicate LUT.

Similar to the non-volatilization process, the loading process may be performed at an appropriate timing, for example, at a regular interval, and may be performed when a read command or a write command is received from the host 10.

FIG. 8A illustrates a data arrangement in a seventh state of an LUT area in the nonvolatile memory 24. FIG. 8B illustrates a data arrangement in an eighth state of the LUT cache 26c. FIG. 8C illustrates a data arrangement in a ninth state of the LUT cache 26c. FIG. 8A illustrates a data arrangement in an address space of the nonvolatile memory 24. FIGS. 8B and 8C illustrate data arrangements in an address space of the LUT cache 26c. A bottom edge in each of FIGS. 8A, 8B, and 8C indicates a base address.

For example, an LUT area of the nonvolatile memory 24 has a plurality of, for example, ten ECC frames ECC0 to ECC9, as illustrated in FIG. 8A. In FIG. 8A, region data is stored in two ECC frames in the aligned state. The five pieces of region data R0 to R4 are stored in ten ECC frames ECC0 to ECC9 with free areas left. No region data is stored in the free areas.

The eighth state of the LUT cache 26c illustrated in FIG. 8B is a state in which the region data (R0 and R1) is stored in the packed area (ECC0b to ECC3b) and a single piece of region data (R2) is stored in the aligned area (ECC4 and ECC5).

The ninth state of the LUT cache 26c illustrated in FIG. 8C is a state in which a plurality of pieces of region data (R0 to R2) are stored in the packed area (ECC0b, ECC1b, ECC2b, ECC3b', ECC4b, and ECC5b), and the region data R2 is stored in the aligned area (ECC4 and ECC5). The region data of the aligned area may be deleted after being stored in the packed area.

When the region data is stored in the packed area of the LUT cache 26c, any ECC frame (here, ECC3b) of the packed area may have a free area (FIG. 8B), and none of the ECC frames may have free areas.

With reference to FIGS. 9A and 9B, a description will be made to explain the loading process when none of the ECC frames of the packed area have free areas as a result of region data being stored in the packed area of the LUT cache 26c.

FIG. 9A illustrates a data arrangement in a tenth state of the LUT cache 26c. The tenth state of the LUT cache 26c illustrated in FIG. 9A is a state in which a plurality of ECC frames ECC2b to ECC3b including the region data R1 are stored in the packed area, and none of the ECC frames have free areas. FIG. 9B illustrates a data arrangement in the eleventh state of the LUT cache 26c.

Figure 10A:
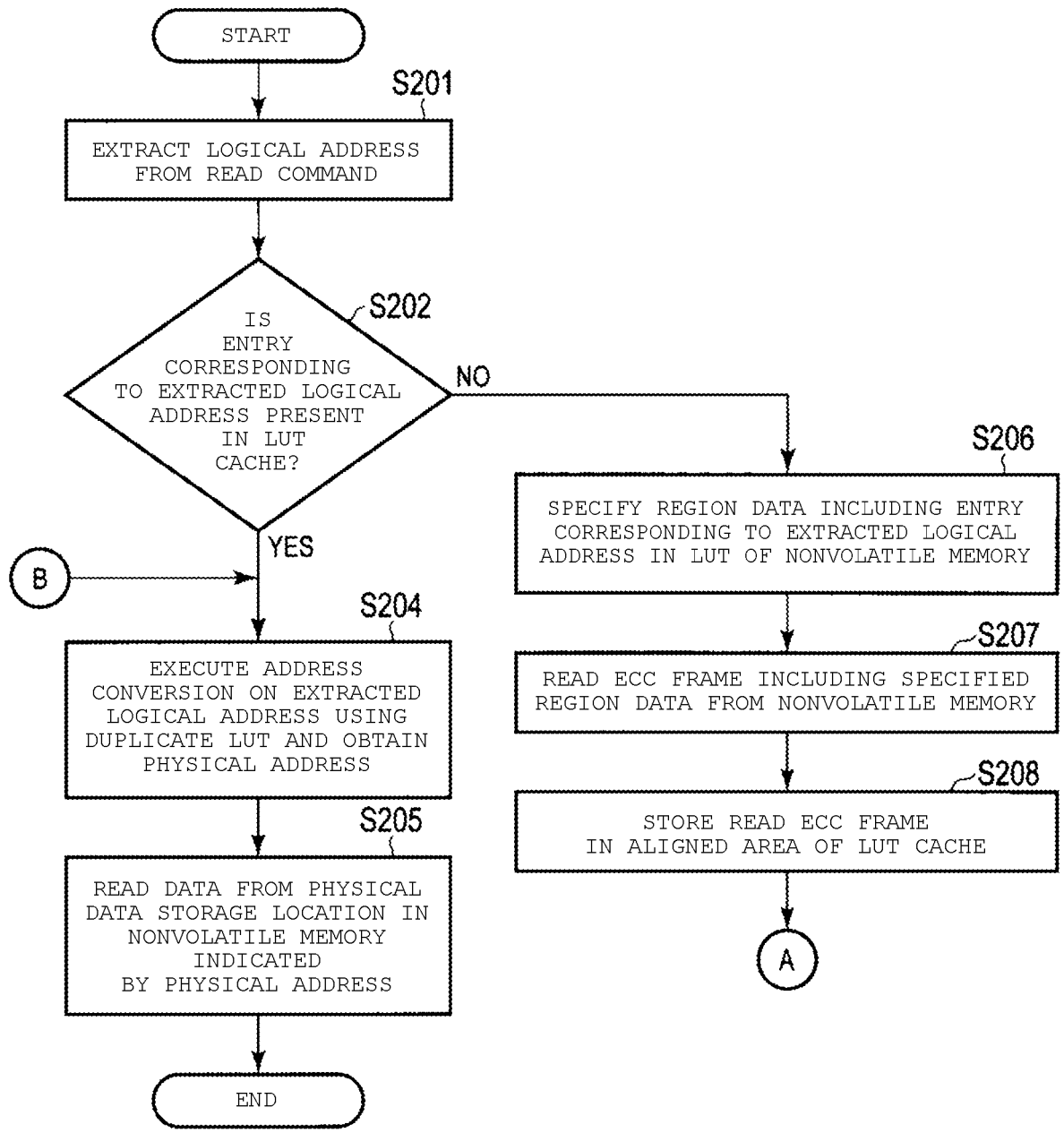
FIG. 10A is a flowchart of the loading process.
Figure 10B:
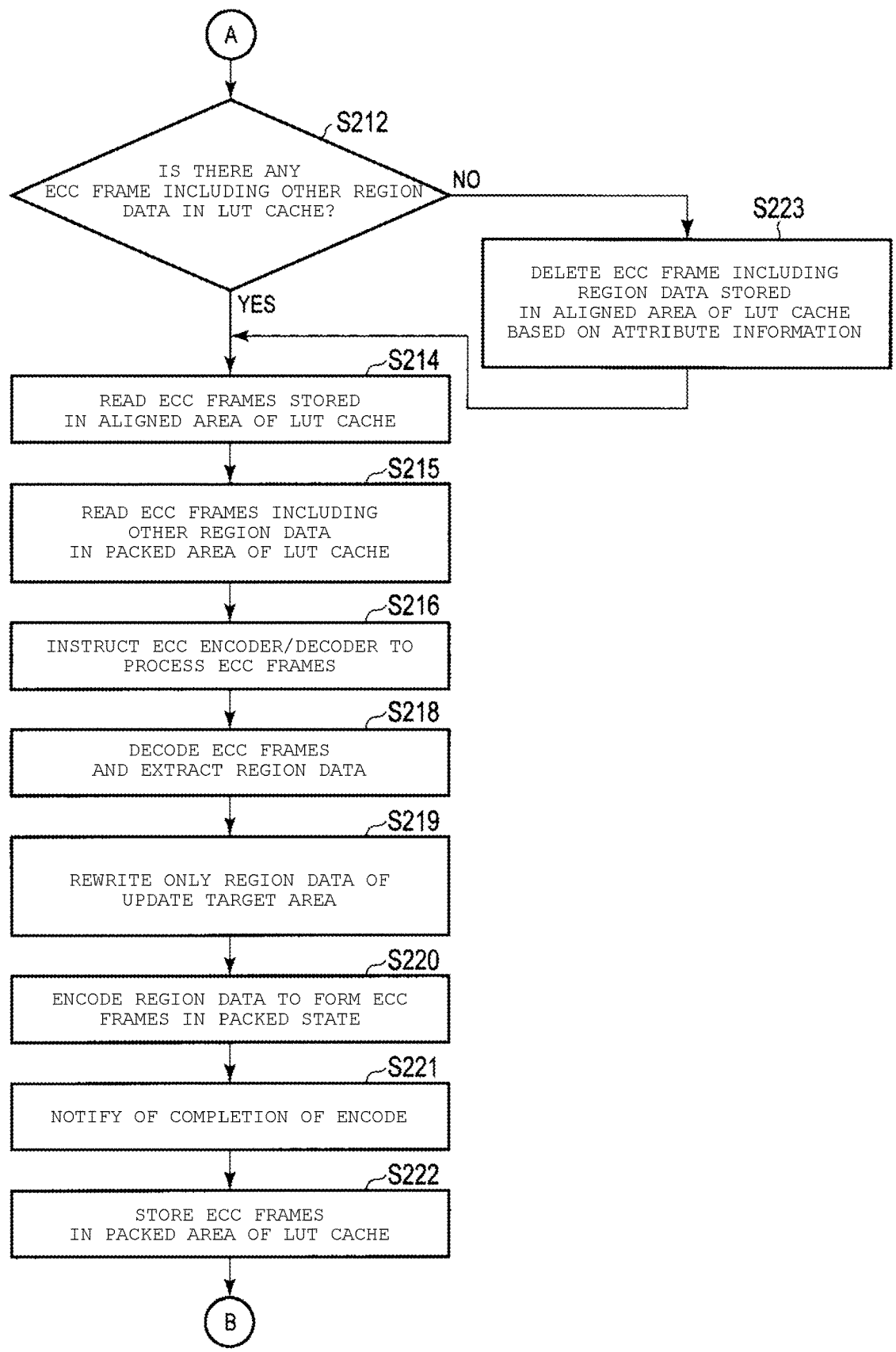
FIG. 10B is a flowchart of the loading process.

The loading process for the address conversion table will be described. FIGS. 10A and 10B illustrate the loading process when a read command is received from the host 10.

When a read command is received, the CPU 32 extracts a logical address from the read command (S201). After the logical address is extracted, the CPU 32 uses the LUT control unit 32c to determine whether an entry corresponding to the logical address extracted in S201 is present in the LUT cache 26c (S202).

When the entry corresponding to the logical address extracted in S201 is present in the LUT cache 26c (YES in S202), the CPU 32 uses the LUT control unit 32c to execute address conversion on the logical address extracted in S201 by using a duplicate LUT and thus to obtain a physical address (S204). After the physical address is obtained, the CPU 32 uses the read control unit 32a to read data from a physical data storage location in the nonvolatile memory 24, indicated by the physical address (S205). Thereafter, the process is finished.

When the entry corresponding to the logical address extracted in S201 is not present in the LUT cache 26c (NO in S202), the CPU 32 specifies region data including the entry corresponding to the logical address extracted in S201 in an LUT stored in the nonvolatile memory 24 (S206). After the region data is specified, the CPU 32 uses the read control unit 32a to read an ECC frame including the specified region data from the nonvolatile memory 24 (S207). After the ECC frame is read from the nonvolatile memory 24, the CPU 32 stores the read ECC frame in an aligned area of the LUT cache 26c (S208).

After the read ECC frame is stored in the aligned area of the LUT cache 26c, the CPU 32 determines whether there is any ECC frame including other region data and free area in the packed area of the LUT cache 26c (S212).

When there is such an ECC frame in the packed area of the LUT cache 26c (YES in S212), the CPU 32 uses the LUT control unit 32c to read the ECC frame from the aligned area of the LUT cache 26c (S214). Additionally, the CPU 32 uses the LUT control unit 32c to read an ECC frame(s) including other region data from the packed area of the LUT cache 26c (S215).

The CPU 32 instructs the ECC encoder/decoder 40 to process the read ECC frame(s) (S216).

Upon receipt of the instruction, the ECC encoder/decoder 40 decodes the ECC frame(s) and extracts the region data (S218).

When there is the ECC frame read in S215, the ECC encoder/decoder 40 rewrites only region data of an update target area in the frame (S219).

After the region data is rewritten, the ECC encoder/decoder 40 encodes the region data to form an ECC frame(s) in the packed state (S220). The ECC encoder/decoder 40 notifies the CPU 32 of completion of the encode (S221).

The CPU 32 stores the formed ECC frame(s) in the packed area of the LUT cache 26c (S222). As a result, a duplicate LUT including the entry corresponding to the logical address extracted from the read command is loaded into the LUT cache 26c. After the ECC frame is stored in the packed area of the LUT cache 26c in S222, the CPU 32 performs address conversion on the logical address extracted in S201 by using the duplicate LUT and thus to obtain a physical address (S204). After the physical address is obtained, the CPU 32 uses the read control unit 32a to read data from a physical data storage location in the nonvolatile memory 24, indicated by the physical address (S205). Thereafter, the process is finished.

When there is no ECC frame including other region data in the aligned area of the LUT cache 26c (NO in S212), the CPU 32 uses the LUT control unit 32c to delete an ECC frame including region data that is stored in the aligned area of the LUT cache 26c and has not been accessed for the longest time based on attribute information (S223). After the ECC frame is deleted, the flow proceeds to a process in S214. The LUT control unit 32c manages a time at which each region is referred to as the attribute information of the LUT.

In the above description, the loading process is performed when the read command is received. However, the loading process may be performed at regular intervals. In such a case, the CPU 32 designates region data to be loaded, reads a plurality of ECC frames including the designated region data from the nonvolatile memory 24, and stores the ECC frames into an aligned area of the LUT cache 26c. Thereafter, the processes from S212 in FIG. 10B are executed.

Since the aligned area is provided in the LUT cache 26c, an ECC frame stored in the nonvolatile memory 24 in the aligned state can be copied to the volatile memory 26 without being changed.

FIG. 11 illustrates an example of data sizes of a duplicate LUT stored in the LUT cache 26c in the aligned state and the packed state, for each drive capacity in a comparison manner. For comparison, a data size when a duplicate LUT is stored in an unpacking state is also shown. In the above description, a plurality of entries are treated as one region, and LUT data is managed in the region unit, but, in the unpacking state, there is no concept of the region, and LUT data is managed in the entry unit. A single entry has a size of 4 KB. In either case, an LUT size also includes ECC data.

In the unpacking state, when the drive capacity is 16 TB or 64 TB, the LUT size exceeds $\frac{1}{1000}$ of the drive capacity. In the aligned state and the packed state, when the drive capacity is 64 TB, the LUT size exceeds $\frac{1}{1000}$ of the drive capacity. However, when the drive capacity is 16 TB, the LUT size does not exceed $\frac{1}{1000}$ of the drive capacity. However, the LUT size is reduced in the aligned state compared with the unpacking state, and the LUT size is further reduced in the packed state compared with the aligned state.

On the other hand, the volatile memory 26 also stores user data other than a duplicate LUT, which is not dependent on the drive capacity. Therefore, in a small-capacity drive, a ratio of user data to a capacity of a mounted DRAM increases, and thus a ratio of the DRAM that can be used for LUT data decreases. Therefore, a footprint reduction effect is great in a small-capacity drive.

Although the packed state is the most efficient storage method, the footprint can be significantly reduced even in the aligned state. However, since data handling cost is cheaper in the aligned state, a size of an aligned area of the LUT cache 26c may be determined in consideration of the footprint and the data handling cost.

Since the process of the aforementioned embodiments can be implemented by a computer program, the same effect as that of the embodiments can be achieved by simply installing and executing the computer program in a computer through a computer readable storage medium storing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
    a first memory;
    a second memory having a higher access speed than that of the first memory; and
    a controller configured to:
        access the first memory using a part of an address conversion table stored in the second memory, the address conversion table including a plurality of regions, each region including a plurality of entries, each entry storing a physical address of the first memory in association with a logical address of data to be written to the first memory;

write, to the first memory, a first frame including data of a first region of the address conversion table and first error correction data therefor in a first format in which a head address of data of a region of the address conversion table aligns with a head address of a frame; and write, to the second memory, a second frame including data of a second region of the address conversion table and second error correction data therefor in either the first format or a second format in which a head address of data of a region of the address conversion table does not align with a head address of a frame.

2. The storage device according to claim 1, wherein the first frame that includes the data of the first region includes a free area.

3. The storage device according to claim 2, wherein the second frame that includes the data of the second region includes no free area.

4. The storage device according to claim 1, wherein the controller is further configured to read the first frame including the data of the first region from the first memory and write the first frame to the second memory in the first format.

5. The storage device according to claim 1, wherein the controller is further configured to read the second frame including the data of the second region from the second memory and write the second frame to the first memory in the first format.

6. The storage device according to claim 1, wherein the controller is further configured to read the first frame including the data of the first region from the first memory and write the first frame to the second memory in the second format.

7. The storage device according to claim 1, wherein the controller is further configured to:
in response to a write command including a first logical address:
correlate the first logical address with a first physical address of the first memory;
generate data of a third region of the address conversion table, indicating a correspondence between the first logical address and the first physical address; and
write to the second memory a third frame including the data of the third region and third error correction data therefor in the second format.

8. The storage device according to claim 1, wherein the controller is further configured to:
in response to a write command including a first logical address:
correlate the first logical address with a first physical address of the first memory;
generate data of a fourth region of the address conversion table, indicating a correspondence between the first logical address and the first physical address; and
write to the second memory a fourth frame including the data of the fourth region and fourth error correction data therefor in the first format, and then convert the fourth frame from the first format to the second format.

9. The storage device according to claim 1, wherein the controller is further configured to:
read the first frame including the data of the first region from the first memory,
read the second frame including the data of the second region from the second memory, and
write to the second memory a frame including the data of the first and second regions and error correction data therefor in the first format.

10. The storage device according to claim 1, wherein a data size of a region is larger than a size of a frame.

11. A method for controlling a storage device including a first memory and a second memory having a higher access speed than that of the first memory, the method comprising:
accessing the first memory using a part of an address conversion table stored in the second memory, the address conversion table including a plurality of regions, each region including a plurality of entries, each entry storing a physical address of the first memory in association with a logical address of data to be written to the first memory;
writing, to the first memory, a first frame including data of a first region of the address conversion table and first error correction data therefor in a first format in which a head address of data of a region of the address conversion table aligns with a head address of a frame; and
writing, to the second memory, a second frame including data of a second region of the address conversion table and second error correction data therefor in either the first format or a second format in which a head address of data of a region of the address conversion table does not align with a head address of a frame.

12. The method according to claim 11, wherein the first frame that includes the data of the first region includes a free area.

13. The method according to claim 12, wherein the second frame that includes the data of the second region includes no free area.

14. The method according to claim 11, further comprising:
reading the first frame including the data of the first region from the first memory and writing the first frame to the second memory in the first format.

15. The method according to claim 11, further comprising:
reading the second frame including the data of the second region from the second memory and writing the second frame to the first memory in the first format.

16. The method according to claim 11, further comprising:
reading the first frame including the data of the first region from the first memory and writing the first frame to the second memory in the second format.

17. The method according to claim 11, further comprising:
in response to a write command including a first logical address:
correlating the first logical address with a first physical address of the first memory;
generating data of a third region of the address conversion table, indicating a correspondence between the first logical address and the first physical address; and
writing to the second memory a third frame including the data of the third region and third error correction data therefor in the second format.

18. The method according to claim 11, further comprising:
in response to a write command including a first logical address:
correlating the first logical address with a first physical address of the first memory;

generating data of a fourth region of the address conversion table, indicating a correspondence between the first logical address and the first physical address; and writing to the second memory a fourth frame including the data of the fourth region and fourth error correction data therefor in the first format, and then converting the fourth frame from the first format to the second format.

19. The method according to claim 11, further comprising:

reading the first frame including the data of the first region from the first memory;

reading the second frame including the data of the second region from the second memory; and writing to the second memory a frame including the data of the first and second regions and error correction data therefor in the first format.

20. The method according to claim 11, wherein a data size of a region is larger than a size of a frame.

* * * * *